United States Patent [19]

Jones

[11] 4,009,017
[45] Feb. 22, 1977

[54] SYSTEMS FOR TRANSFERRING HEAT THROUGH A GLASSWARE FORMING MOLD

[75] Inventor: Stanley Peter Jones, Doncaster, England

[73] Assignee: Emhart (U.K.) Limited, Doncaster, England

[22] Filed: July 21, 1975

[21] Appl. No.: 597,784

[30] Foreign Application Priority Data

July 22, 1974 United Kingdom ............. 32311/74

[52] U.S. Cl. .................................. 65/162; 65/319; 65/356; 165/96; 165/104 F
[51] Int. Cl.² ......................................... C03B 9/38
[58] Field of Search ............ 65/161, 162, 319, 356; 165/104 F, 96

[56] References Cited

UNITED STATES PATENTS

| | | | |
|---|---|---|---|
| 3,031,769 | 5/1962 | Wilson | 165/104 F X |
| 3,242,974 | 3/1966 | Goulounes | 165/104 F X |
| 3,666,433 | 5/1972 | Nebelung et al. | 65/162 X |
| 3,902,550 | 9/1975 | Martin et al. | 165/104 F |

Primary Examiner—Arthur D. Kellogg
Attorney, Agent, or Firm—McCormick, Paulding & Huber

[57] ABSTRACT

A glassware forming system includes a forming mould and cooling means for removing heat from the forming mould. The cooling means comprises a cooling chamber which is spaced from an external surface of the forming mould by a cavity which contain fluidizable material. Means is provided for circulating a cooling fluid, such as water, through the cooling chamber. The cooling means further includes means for forming a fluidized bed from the fluidizable material within the cavity whereby heat may be transferred from the mould to the cooling fluid when a fluidized bed is formed in the cavity. The rate of transfer of heat from the external surface of the forming mould may be varied by controlling the rate of supply of gas to the cavity and thereby varying the degree of fluidization of the fluidized bed, by varying the rate of flow of cooling fluid through the cooling chamber, or by varying the temperature of the cooling fluid which is passed into the cooling chamber.

6 Claims, 4 Drawing Figures

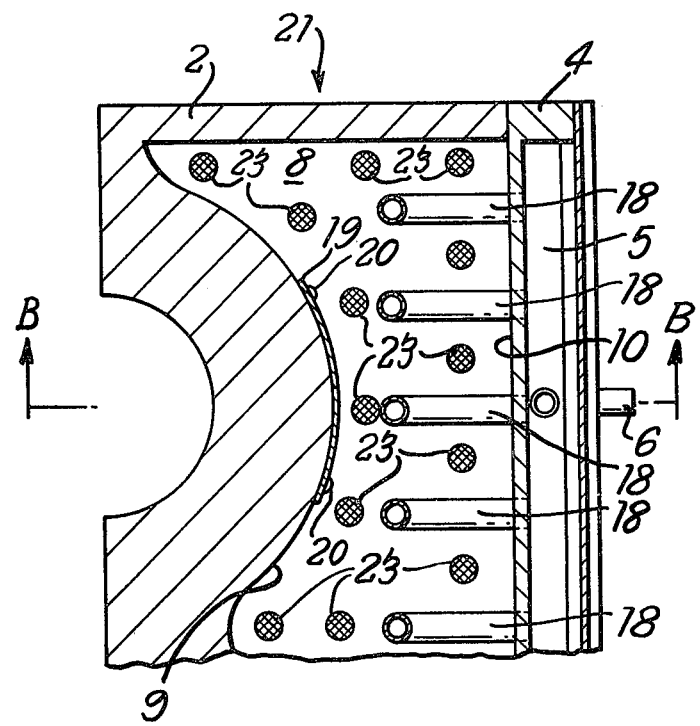

SYSTEMS FOR TRANSFERRING HEAT THROUGH A GLASSWARE FORMING MOLD

CROSS REFERENCE TO RELATED APPLICATIONS

The present application is related to U.S. patent application Ser. No. 597,785 filed on the same day in the names of Stanley Peter Jones and William F. Watson, both applications being assigned to the same assignee.

BACKGROUND OF THE INVENTION

In a conventional I.S. glassware forming machine, glassware forming moulds are cooled by blowing air at the outer surfaces of the moulds. However, it has been found that this method of cooling is difficult to control and is extremely noisy. In more refined systems, air has been ducted to the moulds and has been discharged at the mould surfaces from short-range, i.e. from a distance of 1 inch or less. Although such systems show a slightly improved efficiency and slight reductions in noise levels, the noise levels are still very high. Water cooling has been tried in an effort to overcome the problem of noise, but although water cooling is almost completely silent, cooling has been found to be too severe and attempts to reduce the cooling by reducing the rate of flow of the cooling water have resulted in boiling of the water and loss of control. Hence, water cooling is limited in practice to the cooling of items such as press plungers.

SUMMARY OF THE INVENTION

It is an object of the invention to provide an improved cooling means for a glassware forming system.

According to the present invention there is provided a glassware forming system including a forming mould and cooling means for removing heat from the forming mould, the cooling means comprising a cooling chamber through which a cooling fluid may be circulated and a fluidizable bed of solid particles within a cavity located between a part of the forming mould and the cooling chamber.

It is preferred for the cooling fluid to be water, although other liquids may be used and in some cases the cooling fluid could be a gas. Associated with the cooling means is a source of gas, preferably air, under pressure for fluidizing the fluidizable bed of solid particles. The solid particles are preferably iron shot having a mean diameter of the order of 0.008 inches, but other suitable materials, for example, graded sand, glass ballotini or brass shot, may be used instead of iron shot to form the fluidizable bed.

More specifically in accordance with the present invention there is provided a glassware forming system including a forming mould and cooling means for removing heat from the forming mould, the cooling means comprising a cooling chamber spaced from an external surface of the forming mould by a cavity which contains fluidizable material, means for circulating a cooling fluid such as water through the cooling chamber, and means for forming a fluidized bed from the fluidizable material within the cavity whereby heat may be transferred from the mould to the cooling fluid when a fluidized bed is formed in the cavity.

A glassware forming system in accordance with the present invention may include means for controlling the rate of supply of gas to the cavity whereby the degree of fluidization of the fluidized bed, and hence the rate of transfer of heat from the forming surface, may be varied.

Other means for varying the rate of transfer of heat from the forming surface, which may be used in glassware forming systems in accordance with the present invention, include means for varying the rate of flow of cooling fluid through the cooling chamber, and means for varying the temperature of the cooling fluid circulated through the cooling chamber.

When the fluidizable bed is fluidized, the rate of transfer of heat through the bed is very high, but when the bed is not fluidized it acts virtually as an insulator. Collapsing of the fluidized bed therefore provides a substantially instantaneous cut-off in the transfer of heat from the hotter of the two surfaces to the cooler of the two surfaces.

BRIEF DESCRIPTION OF THE DRAWINGS

In the drawings:

FIG. 4 is a cross-section through the blank mould section of FIGS. 2 and 3 taken along the lines of C—C of FIG. 3 and with the fluidizable bed not present.

In the drawings the same or similar parts are designated by like reference numerals.

DETAILED DESCRIPTION

Figure 1:
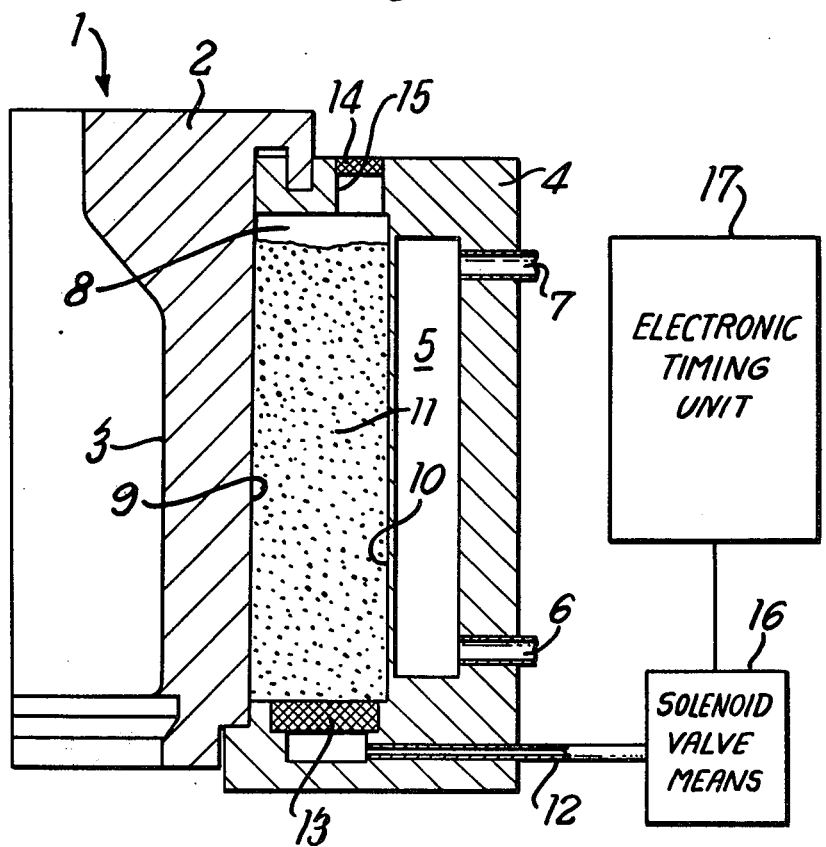
FIG. 1 is a cross-section through a blow mould section for use in a glassware forming system showing a timing unit and valve means associated therewith.

A blow mould section 1 comprises a metal block 2 which has a pair of machined glassware forming surfaces 3. A pair of blow mould sections is mounted at each final forming station in an I.S. glassware forming machine, and the forming surfaces 3 co-operate with similar forming surfaces on a second blow mould section to define the external configuration of glassware to be formed.

A water-cooled member 4 is attached to the metal block 2 on the side remote from the forming surfaces 3, and the water-cooled member 4 includes a cooling chamber 5 into which cooling water is passed through inlet pipes 6. Water flows out of the cooling chamber 5 through outlet pipes 7.

A cavity 8 is provided between a rear surface 9 of the metal block 2 and a front surface 10 of the water-cooled member 4. The cavity 8 is almost filled with a bed 11 of fluidizable material. The material which comprises the fluidizable bed 11 has a high density and a high heat capacity, is stable at the operating temperature, and is of a particle size suitable for fluidization. Suitable materials are brass or iron shot. It is preferred to use iron shot which has a mean diameter of the order of 0.008 inches.

Fluidizing gas, which is preferably compressed air, is introduced into the cavity 8 through a gas supply pipe 12 and a porous diffusing member 13. The diffusing member 13 may be porous ceramic material, porous metal or wire mesh clamped between plates. The diffusing member 13 should offer a total resistance to air flow which is several times the resistance to air flow of the bed 11 in its fluidized condition, in order to provide a uniform distribution of air across the bed and thereby produce uniform fluidization. It has been found to be advantageous for the ratio of the resistance to air flow of the diffusing member 13 to the resistance to air flow of the bed 11 in its fluidized state, to be between 2:1 and 6:1. Air is passed through the diffusing member 13 at a rate between about two and about five times the minimum rate required to produce fluidization of the bed 11. Minimum fluidization velocities for air for particles of the order of 0.008 inches in diameter are less than 1 foot per second. Air passing up through the bed 11 passes out from the cavity 8 through a retaining gauze 14 which is releasably mounted in an opening 15 in the top of the water-cooled member 4.

In operation of the glassware forming system, when water is circulated through the cooling chamber 5 and the bed 11 is fluidized by passing air through the gas supply pipe 12, heat from the forming surfaces 3 which are in contact with molten glass during forming passes from the metal block 2 through the rear surface 9 and is transferred to the water in the cooling chamber 5 by the fluidized bed 11. So long as the bed 11 is fluidized, the rate of transfer of heat from the forming surfaces 3 to the water in the cooling chamber 5 is very high, but when the bed 11 is not fluidized, the forming surfaces are virtually insulated from the water in the cooling chamber 5. It is therefore possible to regulate the rate at which heat is transferred from the forming surfaces 3 by varying the rate of supply of the gas to the bed 11. A temperature sensing element may be mounted in a selected port of the metal block 2, on one of the forming surfaces 3, or on the rear surface 9 of the metal block 2, and valve means may be provided for regulating the flow rate of the supply of gas through the gas supply pipe 12 to the bed 11 in response to the temperature sensed by the temperature sensing element.

Figure 2:
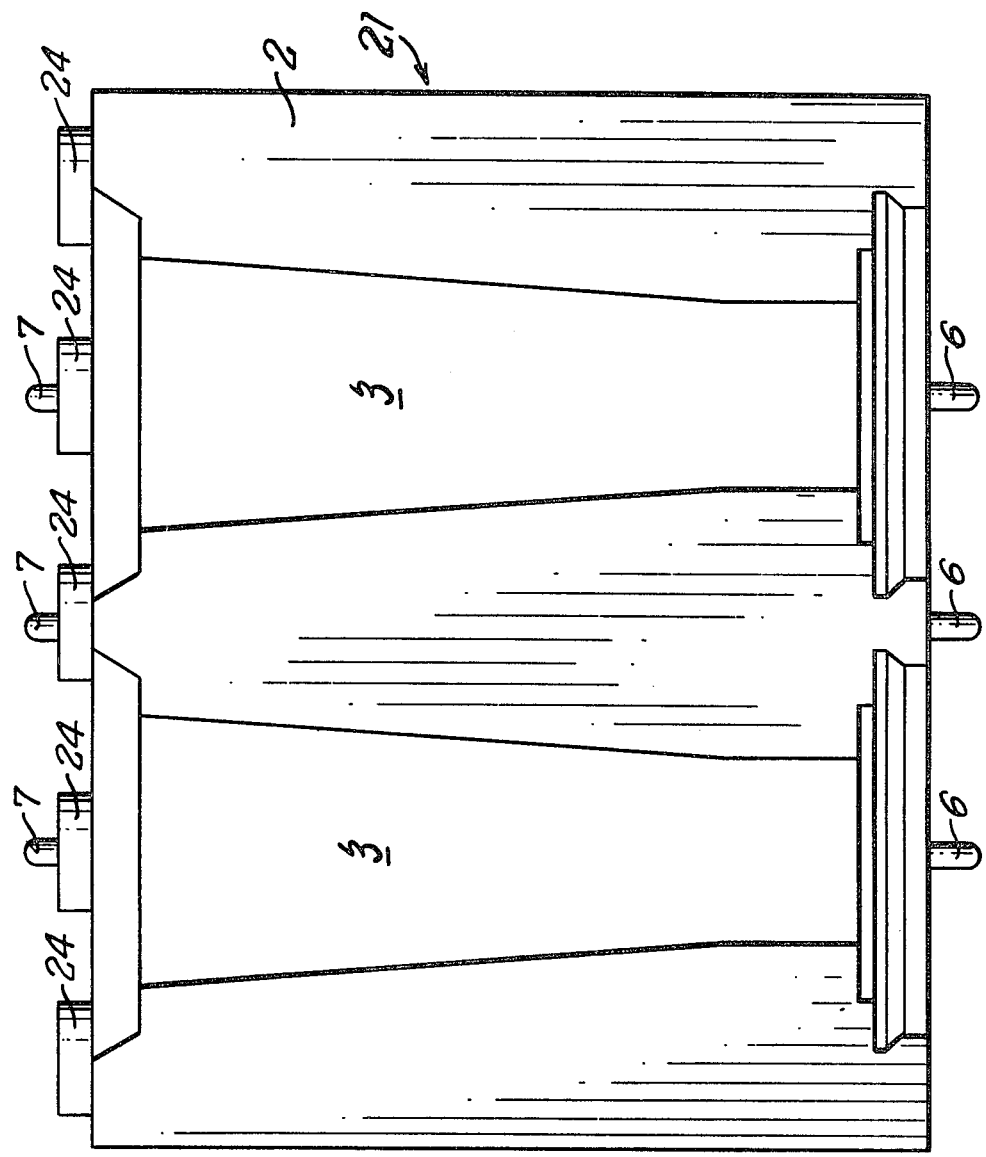
FIG. 2 is a front elevation of a blank mould section for use in a glassware forming system, the elevation being of the mould section of FIG. 3, viewed from the left in that Figure.
Figure 3:
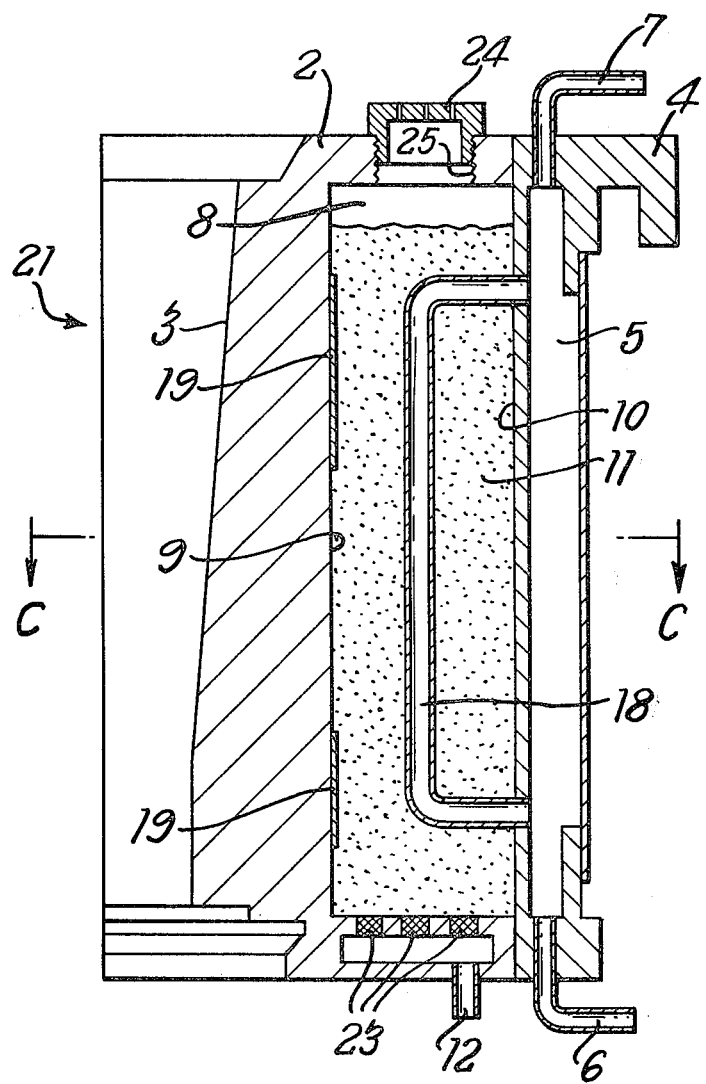
FIG. 3 is a cross-section through the blank mould section of FIG. 2 taken along the lines B—B of FIG. 4.

In FIGS. 2 to 4 of the drawings, there is shown a blank mould section 21. Those parts of the blank mould section 21 which are similar to parts of the blow mould 1, have the same reference numerals. A pair of blank mould sections is mounted at each blank forming station in an I.S. glassware forming machine and the forming surfaces 3 co-operate with similar forming surfaces on a second blank mould section to define the external configuration of parisons to be formed.

The blank mould section 21 differs from the blow mould section 1 in that porous discs 23 are provided in place of the diffusing member 13. However, the porous disc 23 are of the same material as the diffusing member 13 and present the same resistance to air flow as the diffusing member 13. In place of the retaining gauze 14 in the opening 15 in the top of the water-cooled member 4, porous metal caps 24 for allowing air passing up through the bed 11 to escape from the cavity 8 are threadedly mounted in holes 25 in the top of the metal block 2.

The effective surface area of the front surface 10 of the water-cooled member 4 is increased in the embodiment of FIGS. 2 to 4 by providing additional cooling pipes 18 which extend from the cooling chamber 5 and pass through the bed 11. Similar cooling pipes may be provided in the blow mould section 1. The effective surface area of the front surface 10 in either the blow mould section 1 or the blank mould section 21 may alternatively be increased by the provision of solid fins or water-cooled fins extending into the bed 11. Similarly the effective surface area of the rear surface 9 of the metal block 2 may be increased, and hence the rate of flow of heat into the fluidized bed 11 may be increased, by the provision of solid fins extending from the metal block 2 into the bed 11.

If it is desired to restrict the flow of heat into the fluidized bed 11 from specific parts of the forming surfaces 3, shielding plates 19 may be mounted within the cavity 8 adjacent to the rear surface 9 and between the bed 11 and parts of the forming surfaces 3. The shielding plates 19 are preferably made of metal and may be attached to the metal block 2 in a known manner, for example by bolts 20. The insulating effect of the shielding plates is increased by the inclusion of an insulating medium, for example asbestos paper, between the shielding plates 19 and the rear surface 9.

The rate of transfer of heat from the forming surfaces 3 may be varied by varying the rate of supply of air to the bed 11 and thereby varying the degree of fluidization of the bed 11 as discussed hereinabove. Other methods of varying the rate of transfer of heat from the forming surfaces 3 to the water in the cooling chamber 5, include varying the temperature of the water supplied to the cooling chamber 5 through the inlet pipes 6, and varying the rate of flow of water into the cooling chamber 5 through the inlet pipes 6.

It is an advantage of the preferred embodiments of the present invention that the cooling of the forming surfaces is very uniform since all parts of the fluidized bed are at a substantially uniform temperature.

The cooling system in the preferred embodiments of the invention described has the further advantage that it is virtually silent in operation.

Most of the heat transferred from the forming surfaces of the preferred embodiments of the invention which have been described is transferred to the water passing through the cooling chamber, and only a small proportion of the heat is absorbed by the air which is used to fluidize the fluidizable bed. This results in a greatly improved working environment around the glassware forming machine, since the heat transferred to the cooling water is dissipated outside the factory.

I claim:

1. A glassware forming system including a forming mould and cooling means for removing heat from the forming mould, the cooling means comprising means defining a cooling chamber through which a cooling fluid may be circulated and a fluidizable bed of solid particles within a cavity located between a part of the forming mould and the cooling chamber.

2. A glassware forming system including a forming mould and cooling means for removing heat from the forming mould, said cooling means comprising means defining a cooling chamber spaced from an external surface of said forming mould by a cavity, fluidizable material contained within said cavity, means for circulating a cooling fluid through said cooling chamber, means for forming a fluidized bed from said fluidizable material within said cavity, and means for varying the quantity of heat transferred from said forming mould to said cooling chamber, whereby heat may be transferred from the mould to the cooling fluid when a fluidized bed is formed in the cavity.

3. A glassware forming system according to claim 2 including a shielding plate which is mounted within the cavity between the fluidizable bed and a part of the mould for reducing heat flow from the said part of the mould through the fluidized bed.

4. A glassware forming system according to claim 2 wherein said means for forming a fluidized bed comprises means for supplying gas to said cavity and wherein said means for varying the quantity of heat transferred from said forming mould to said cooling chamber comprises means for varying the rate of supply of said gas to said cavity, whereby the degree of fluidization of the fluidized bed, and hence the rate of transfer of heat from the said external surface, may be varied.

5. A glassware forming system according to claim 2 wherein said means for varying the quantity of heat transferred from said forming mould to said cooling chamber comprises means for varying the rate of flow of cooling fluid through said cooling chamber.

6. A glassware forming system according to claim 2 wherein said means for varying the quantity of heat transferred from said forming mould to said cooling chamber comprises means for varying the temperature of the cooling fluid being circulated through said cooling chamber.

* * * * *